United States Patent
Yvon (10) Patent No.: US 9,836,043 B2
(45) Date of Patent: Dec. 5, 2017

(54) HARNESS SUB-ASSEMBLY RATIONALIZATION

(71) Applicant: Mentor Graphics Corporation, Wilsonville, OR (US)

(72) Inventor: Jean-Marc Yvon, Altrincham (GB)

(73) Assignee: Mentor Graphics Corporation, Wilsonville, OR (US)

( * ) Notice: Subject to any disclaimer, the term of this patent is extended or adjusted under 35 U.S.C. 154(b) by 379 days.

(21) Appl. No.: 14/608,611

(22) Filed: Jan. 29, 2015

(65) Prior Publication Data

US 2016/0224022 A1 Aug. 4, 2016

(51) Int. Cl.
*G05B 19/418* (2006.01)
*G06Q 10/08* (2012.01)

(52) U.S. Cl.
CPC . *G05B 19/41865* (2013.01); *G05B 19/41805* (2013.01); *G06Q 10/0875* (2013.01); *G05B 2219/32082* (2013.01); *Y02P 90/04* (2015.11); *Y02P 90/20* (2015.11); *Y02P 90/265* (2015.11)

(58) Field of Classification Search
CPC ............... G06Q 10/0875; G06F 17/50; G06B 19/41865
USPC ........................................................ 700/107
See application file for complete search history.

(56) References Cited

U.S. PATENT DOCUMENTS

| | | | |
|---|---|---|---|
| 7,103,434 B2* | 9/2006 | Chernyak | G06F 17/50 700/103 |
| 7,107,197 B1* | 9/2006 | Shropshire | B60R 16/0207 700/97 |
| 8,700,416 B2* | 4/2014 | Thomas | G06Q 10/06 700/107 |
| 2003/0126576 A1* | 7/2003 | Graham | G06F 17/509 716/126 |
| 2007/0141899 A1* | 6/2007 | Saini | G06F 17/509 439/502 |
| 2014/0364985 A1* | 12/2014 | Tiwari | G06Q 10/0875 700/107 |
| 2015/0186457 A1* | 7/2015 | Enomoto | G06F 17/30424 707/769 |
| 2016/0171129 A1* | 6/2016 | Nakamura | G06F 17/5095 703/1 |

* cited by examiner

*Primary Examiner* — Chun Cao
(74) *Attorney, Agent, or Firm* — Mentor Graphics Corporation (57) ABSTRACT

This application discloses a system implementing tools and mechanisms to generate a structured bill of materials for a wire harness described in a harness design, identify variable parameter corresponding to a physical characteristic for a first sub-assembly in the structured bill of materials for the wire harness, and substitute the first sub-assembly in the structured bill of materials for the wire harness with a second sub-assembly based, at least in part, on the variable parameter for the first sub-assembly.

20 Claims, 6 Drawing Sheets

HARNESS SUB-ASSEMBLY RATIONALIZATION

TECHNICAL FIELD

This application is generally related to electronic design automation and, more specifically, to sub-assembly rationalization in a Structured Bill of Materials (SBOM) for a wire harness.

BACKGROUND

Modern manufacture of wire harnesses is often performed through a sequence of steps, rather than as a single operation from a collection of basic components. For example, the manufacture of a wire harness can include components, such as connectors, wires, tapes and tubes, or the like, which can be variously manufactured into one or more sub-assemblies. These sub-assemblies can then be combined together, sometimes along with additional components, to form additional sub-assemblies. This process of sub-assembly construction from other sub-assemblies and/or components can continue until a wire harness has been built. In order to identify this sequence of manufacturing steps during the design phase, some design tools can decompose harness designs into a Structured Bill of Materials (SBOM) that describes the sequential manufacturing process in a hierarchical manner.

Since the sequential manufacturing process is broken down into multiple discrete steps, many manufacturers distribute the construction of sub-assemblies, for example, in different portions of a factory or in different factories altogether. In order to keep track of the different sub-assemblies, the design tools can generate unique or distinctive part numbers to the various sub-assemblies utilized in the sequential manufacturing process, which can be incorporated into the SBOM. For example, the design tool can compute the part numbers based on a description of the sub-assembly structure as well as the process utilized to manufacture the sub-assembly. While the design tool can utilize a harness design to generate an SBOM with sub-assemblies specific to the wire harness described in the harness design, practically speaking, the manufacture of these sub-assemblies can be highly-customized—rendering the resulting wire harness costly and inefficient to produce.

SUMMARY

This application discloses a system implementing tools and mechanisms to generate a structured bill of materials for a wire harness described in a harness design, identify variable parameter corresponding to a physical characteristic for a first sub-assembly in the structured bill of materials for the wire harness, and substitute the first sub-assembly in the structured bill of materials for the wire harness with a second sub-assembly based, at least in part, on the variable parameter for the first sub-assembly.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
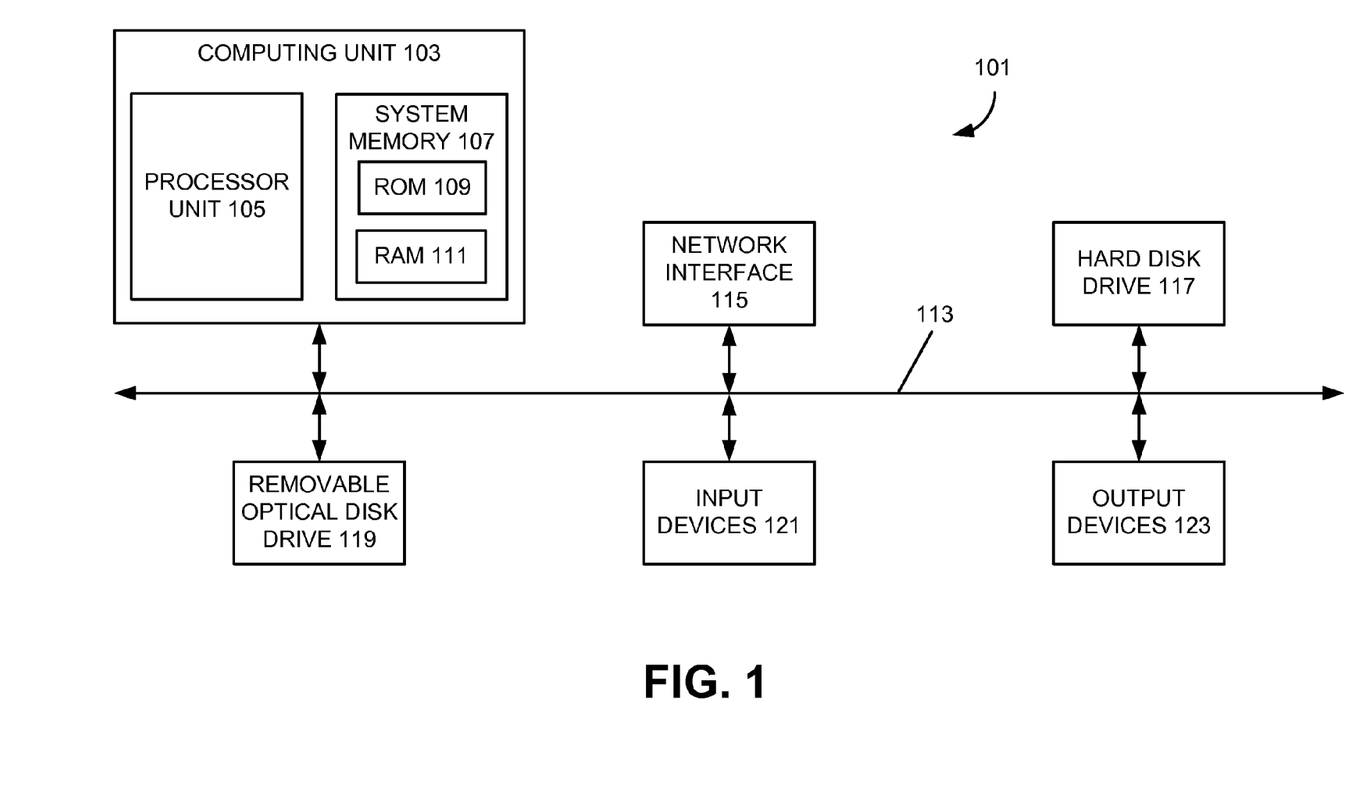
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
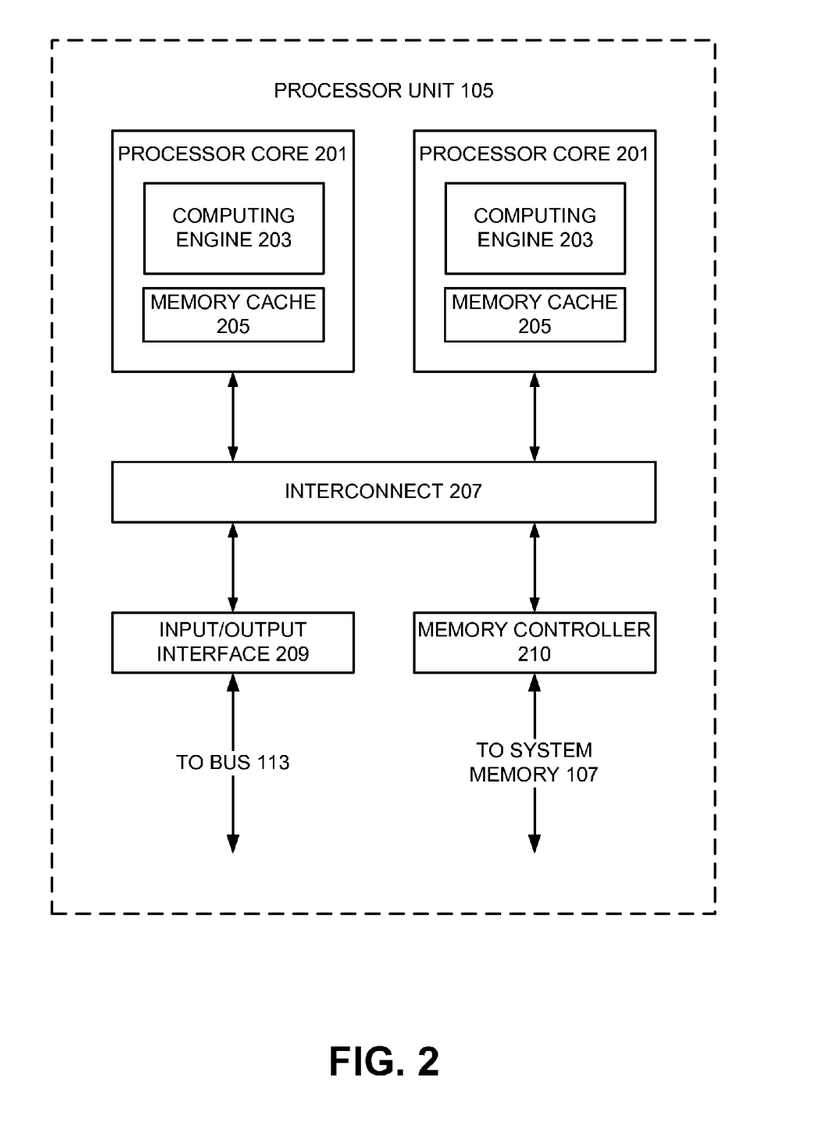

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Harness Sub-Assembly Rationalization

Figure 3:
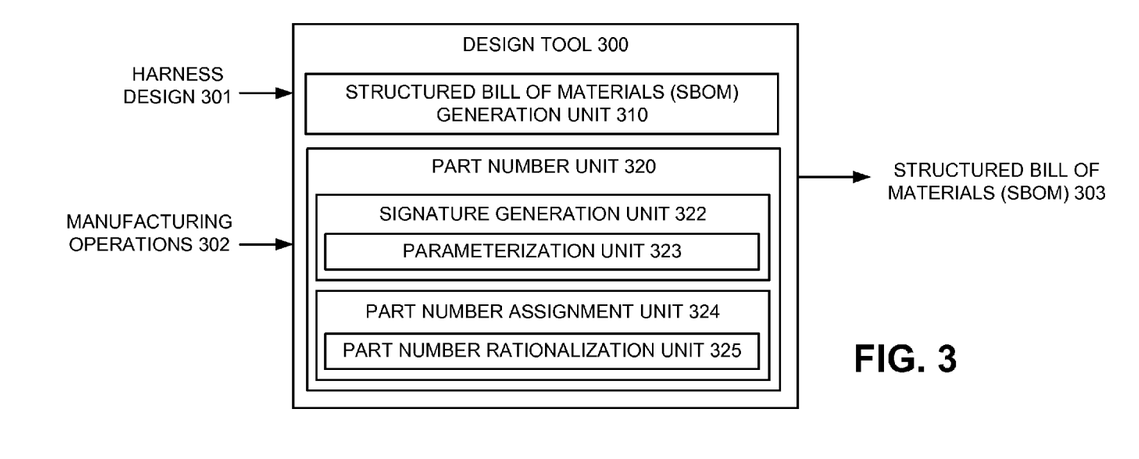
FIG. 3 illustrates an example design tool to generate a structured bill of materials for a wire harness with rationalized sub-assemblies according to various embodiments of the invention.

FIG. 3 illustrates an example design tool 300 to generate a structured bill of materials (SBOM) 303 for a wire harness with rationalized sub-assemblies according to various embodiments of the invention. Referring to FIG. 3, the design tool 300 can receive a harness design 301 describing a wire harness. For example, the harness design 301 can describe components in the wire harness, physical attributes of the wire harness or components, connectivity of the wire harness or components, relative orientation of the components to each other in the wire harness, or the like.

The design tool 300 also can receive manufacturing operations 302, sometimes called an SBOM pattern, which can describe a set of fabrication techniques available to a manufacturer. For example, certain manufacturers may have equipment capable of generating or modifying components or sub-assemblies with particular specifications, which can be specified in the manufacturing operations 302. In some embodiments, the manufacturing operations 302 can be a manufacturing program model describing operations that can be performed to build a wire harness based on a manufacturing capability of the manufacturer.

The design tool 300 can generate the structured bill of materials 303 from the harness design 301 and the manufacturing operations 302. In some embodiments, the structured bill of materials 303 can represent the wire harness described in the harness design 301 as tree of sub-assemblies and components. The connectivity of the tree can represent manufacturing processes for building the wire harness from the components and sub-assemblies. In some embodiments, the structured bill of materials 303 can represent the wire harness hierarchically, for example, when the tree includes a description of a sub-assemblies being built with one or more of the other sub-assemblies. The structured bill of materials 303 can represent the sub-assemblies and components with corresponding part numbers, which can be unique or distinctive to the respective sub-assemblies and components. An example of a structured bill of materials is described below with reference to FIG. 4.

Figure 4:
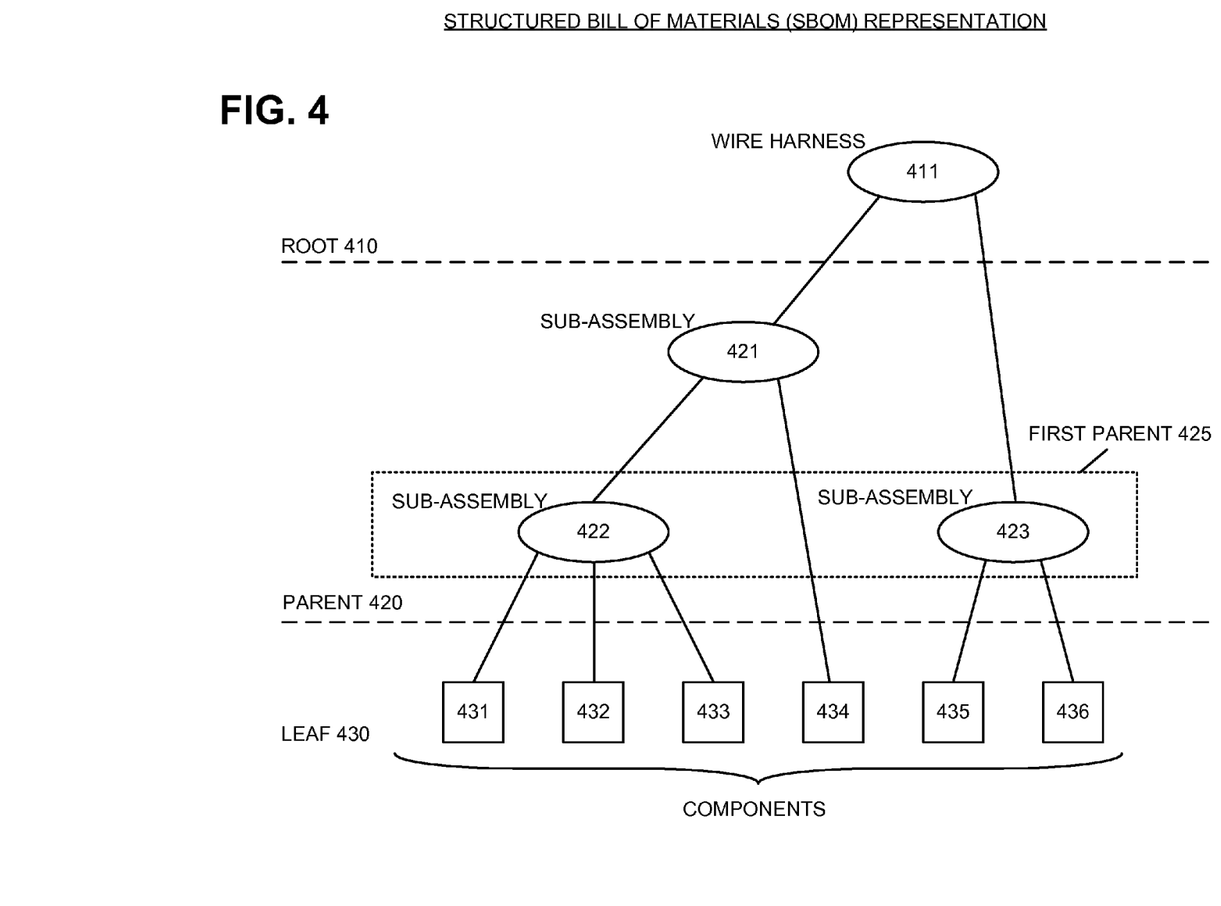
FIG. 4 illustrates an example representation of structured bill of materials for a wire harness according to various embodiments of the invention.

FIG. 4 illustrates an example representation of structured bill of materials (SBOM) for a wire harness 411 according to various embodiments of the invention. Referring to FIG. 4, the structured bill of materials for the wire harness 411 can be represented as a tree-structure having multiple manufacturing stages, such as a root stage 410, a sub-assembly stage 420, and a leaf stage 430. A top-level manufacturing stage, or the root stage 410, can correspond to a fully-built version of the wire harness 411. The parent stage 420 can include one more sub-assemblies, such as sub-assemblies 421-423, which can correspond to an intermediate-level manufacturing stage. The leaf stage 430 can include components 431-436 of the wire harness 411.

The connectivity of the tree for the structured bill of materials for the wire harness 411 can illustrate how the components 431-436 in the leaf stage 430 combine to form different sub-assemblies 421-423 in the parent stage 420. The connectivity of the tree also can illustrate how the sub-assemblies 421-423 in the parent stage 420 can be combined, sometimes along with one or more of the components 431-436 in the leaf stage 430, to form other sub-assemblies and ultimately the wire harness 411 in the root stage 410. In some embodiments, sub-assemblies that are built only with components 431-436, and not other subassemblies, such as subassemblies 422 and 423, can be called first parent 425 sub-assemblies.

Referring back to FIG. 3, the design tool 300 can include a structured bill of materials (SBOM) generation unit 310 to generate the structured bill of materials 303 from the harness design 301 and the manufacturing operations 302. The structured bill of materials generation unit 310 can decompose the harness design 301 into components and various sub-assemblies, and organize them in a hierarchical form to represent the manufacturing processes capable of building the wire harness described in the harness design 301 from the components and sub-assemblies.

Since each component and sub-assembly in the structured bill of materials 303 can be represented by a part number, the design tool 300 can include a part number unit 320 to assign part numbers to the structured bill of materials 303, which can represent the components and the sub-assemblies. These part numbers can be unique or distinct from each other. In some embodiments, the part numbers can be based on a description of the components or sub-assemblies. The description of a component can include physical attributes of the component, such as a component type, size, color, material, dimensions, or the like. The description of each sub-assembly can include a topological description of the sub-assembly, a dimensional description of the sub-assembly, and/or a structural description of the sub-assembly. The topological description of the sub-assembly can include a list of the components in the sub-assembly, a description of connections between the components, or the like. The dimensional description of the sub-assembly can include a description of physical structures and locations of any of the components, or the like. For example, when a component has a variable physical attribute, such as a length of a wire, the physical structure description can include a value corresponding to the length of the wire. In other examples, when a component, such as mechanically-connectable component, has an adjustable location in the sub-assembly, the description can include a location of the component in the sub-assembly. The structural description of the sub-assembly can include descriptions of components and/or other sub-assemblies within the sub-assembly, which can identify the manufacturing process to build the sub-assembly.

The part number unit 320 can include a signature generation unit 322 to generate a signature for components or sub-assemblies in the structured bill of materials 310. In some embodiments, the signature generation unit 322 can receive the description of the components or sub-assemblies from the structured bill of materials generation unit 310. The signature generation unit 322 can compress the description of the components or sub-assemblies into corresponding signatures of the components or sub-assemblies. In some embodiments, the signature generation unit 322 can utilize a hash algorithm to perform the compression of the description, which can generate a unique or distinct signature for each of the components or sub-assemblies based on their corresponding descriptions.

The part number unit 320 can include a part number assignment unit 324 to utilize the signatures generated in the signature generation unit 322 to assign part numbers to the components and sub-assemblies. In some embodiments, the part number assignment unit 324 can assign the signatures to the components and sub-assemblies in the structured bill of materials 303, as part numbers. For example, when the signature generation unit 322 generates a signature based on a description of a sub-assembly, the part number assignment unit 324 can assign that signature to that sub-assembly in the structured bill of materials 303 as a part number. In this instance, when a part number is assigned to a sub-assembly having a description utilized to generate that part number, the part number can be referred to as a natural part number.

The part number unit 320, rather than assign a natural part number to the sub-assembly in the structured bill of materials 303, in some embodiments, can selectively substitute that natural part number with a rationalized part number corresponding to a different sub-assembly. For example, the part number unit 320 can determine a class or group that a sub-assembly belongs to, for example, by abstracting one or more attributes of the sub-assembly, and identify one or more other sub-assemblies within the class or group. The part number unit 320 can select a part number corresponding to one of the other sub-assemblies identified within the class or group to substitute for a part number of the sub-assembly based on any number of different factors, such as manufacturing cost, sub-assembly availability, time to manufacture, or the like. The structured bill of materials 303 can include the selected part number, as a rationalized part number, for the sub-assembly, which can effectively substitute which sub-assembly the wire harness will be manufactured with during production.

In some embodiments, the signature generation unit 322 can include a parameterization unit 323 and the part number assignment unit 324 can include a part number rationalization unit 325, the combination of which can identify one or more rationalized part numbers for a particular sub-assembly and selectively substitute natural part numbers for the rationalized part numbers during part number assignment to that sub-assembly. Example implementations of this harness sub-assembly rationalization are described below with reference to FIGS. 5-7.

Figure 5:
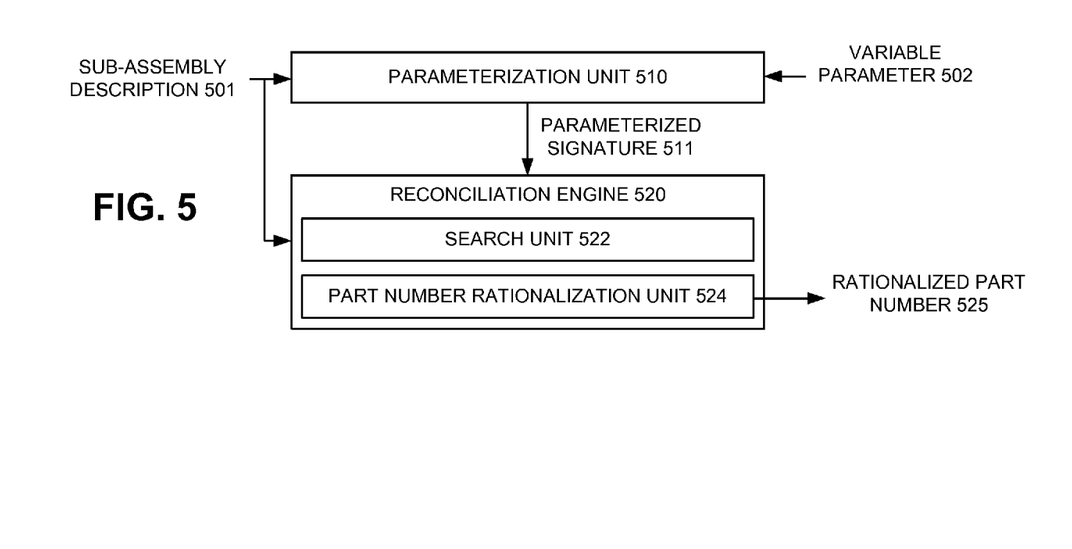
FIG. 5 illustrates an example implementation of a harness sub-assembly rationalization system according to various embodiments of the invention.

FIG. 5 illustrates an example implementation of a harness sub-assembly rationalization system according to various embodiments of the invention. Referring to FIG. 5, the harness sub-assembly rationalization system can include a parameterization unit 510 to generate a parameterized signature from a sub-assembly description 501 and a variable parameter 502. The sub-assembly description 501 can include a topological description of a sub-assembly, a dimensional description of the sub-assembly, and/or a structural description of the sub-assembly. The variable parameter 502 can identify a portion of the sub-assembly description 501 that can be abstracted in order to generate a signature for a class of sub-assemblies. The variable parameter 502, in some embodiments, can correspond to a physical attribute, such as a length of a wire or location of a mechanical component, which can be set to a particular value or location in the sub-assembly description 501.

The parameterization unit 510 can modify the sub-assembly description 501 based on the variable parameter 502, for example, removing the particular value in the sub-assembly description 501 and optionally replacing it with a generic value or symbol. The parameterization unit 510 can utilize the modified sub-assembly description 501 to generate the parameterized signature 511 that corresponds to a class or group of sub-assemblies that includes the sub-assembly disclosed in the sub-assembly description 501 along with one or more additional sub-assemblies.

The harness sub-assembly rationalization system can include a reconciliation engine 520 to determine rationalized part number 525 for the sub-assembly based, at least in part, on the parameterized signature 511. The reconciliation engine 520 can include a search unit 522 to search a library of sub-assemblies to locate a sub-assembly having the same parameterized signature 511 indicating that the located sub-assembly belongs to the class or group of sub-assemblies. The part number rationalization unit 524 can assign a part number of the located sub-assembly to the sub-assembly associated with the description 501, which can be a rationalized part number for the sub-assembly associated with the description 501.

In some embodiments, the search unit 522 can locate multiple entries for sub-assemblies in the library of sub-assemblies that match the parameterized signature 511. The search engine 522 can retrieve a portion of the entries, for example, in tags associated with the entries, which can correspond to a particular value or range of values associated with the variable parameter 502 for the corresponding located sub-assemblies. The part number rationalization unit 524 can analyze the retrieved portions of the entries and the sub-assembly description 501 to determine which part number of the located sub-assemblies to utilize as the rationalized part number 525. For example, when the variable parameter 502 corresponds to a wire length, the located entries can correspond to two different sub-assemblies having two different wire lengths. The part number rationalization unit 524 can determine whether the either of the two located sub-assemblies can and/or should be substituted for the sub-assembly associated with the sub-assembly description 501 based on their wire lengths. The part number rationalization unit 524 can then assign a part number of one of the located sub-assemblies to the sub-assembly associated with the sub-assembly description 501, which can be a rationalized part number for the sub-assembly associated with the sub-assembly description 501.

Figure 6:
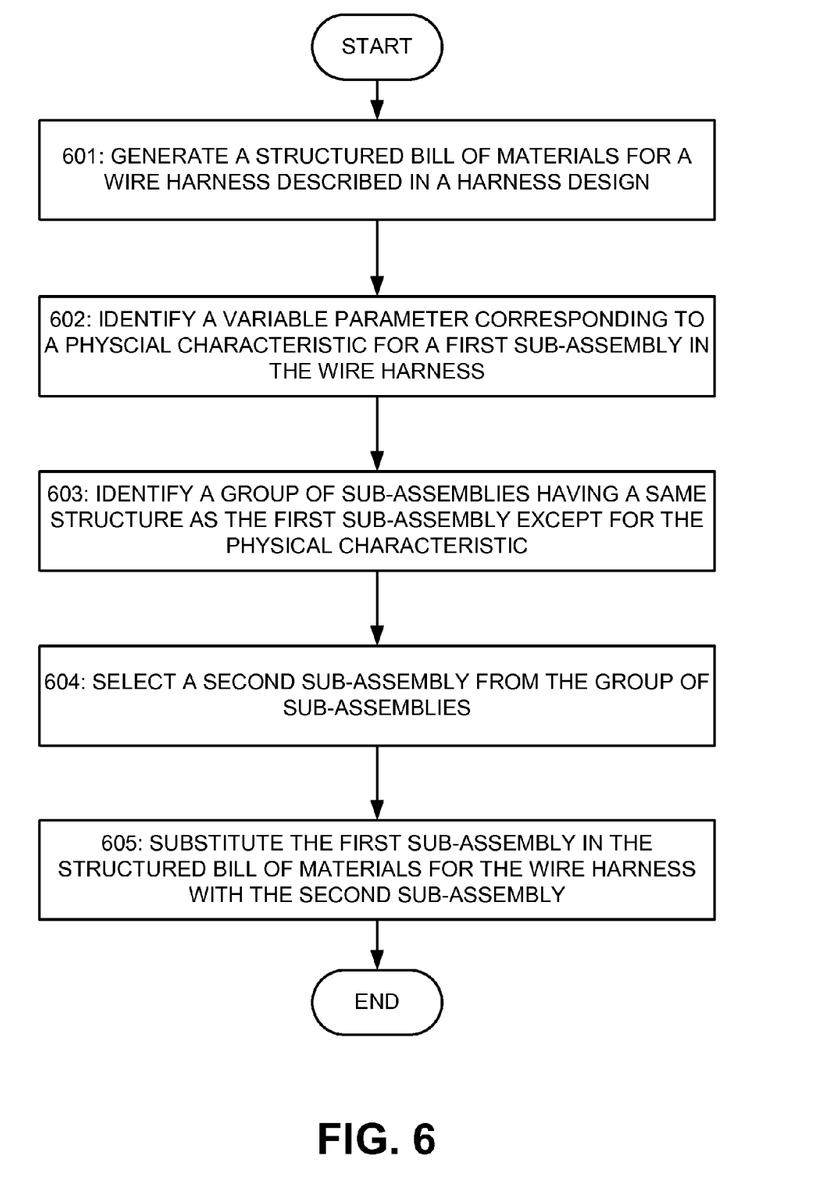
FIG. 6 illustrates a flowchart showing an example harness sub-assembly rationalization according to various embodiments of the invention.

FIG. 6 illustrates a flowchart showing an example harness sub-assembly rationalization according to various embodiments of the invention. Referring to FIG. 6, in a block 601, a computing system can generate a structured bill of materials for a wire harness described in a harness design, for example, from a harness design and an SBOM pattern or set of manufacturing capabilities. The structured bill of materials can include a set of components and a set of sub-assemblies, which can be organized in a hierarchical manner to represent the manufacturing process capable of building the wire harness described in the harness design from the components and sub-assemblies. Each component and sub-assembly in the structured bill of materials can be represented by a part number.

In a block 602, the computing system can identify a variable parameter corresponding to a physical characteristic for a first sub-assembly in the structured bill of materials for the wire harness. For example, the variable parameter can correspond to an attribute of a component in the first sub-assembly, such as wire length or the like. In some embodiments, the variable parameter can be received by the computing system via a user interface or can be automatically determined by the computing system based on a description of the first sub-assembly.

In a block 603, the computing system can identify a group of one or more sub-assemblies having a same structure as the first sub-assembly except for the physical characteristic corresponding to the variable parameter. As discussed above, this identification can be performed by parameterizing a signature of the first sub-assembly, for example, by rendering the variable parameter generic in a description of the first sub-assembly and generating a signature from the description with the generic parameter, and then utilizing the parameterized signature to locate the group of one or more sub-assemblies.

In a block 604, the computing system can select the second sub-assembly from the group of one or more sub-assemblies. The selection of the second sub-assembly can be based on a variety of factors including a value of the variable parameter in the second sub-assembly, a manufacturing cost difference between the first and second sub-assemblies, a manufacturing efficiency between the first and second sub-assemblies, or the like.

In a block 605, the computing system can substitute the first sub-assembly in the structured bill of materials for the wire harness with a second sub-assembly. The computing system can assign a part number associated with the second sub-assembly to the first-subassembly in the structured bill of materials as a rationalized part number. In some embodiments, the computing system also can assign both the rationalized part number and the natural part number to the first sub-assembly in the structured bill of materials, which can allow for traceability.

Figure 7:
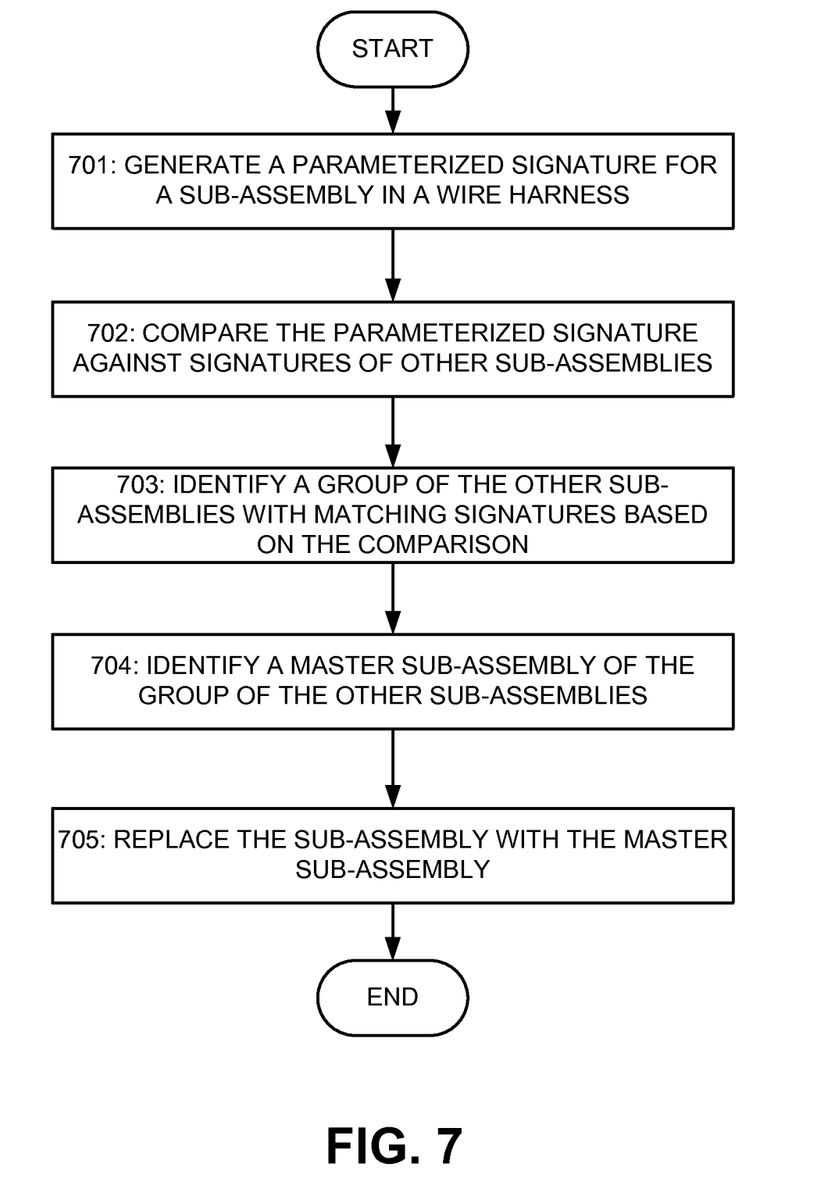
FIG. 7 illustrates a flowchart showing an example harness sub-assembly rationalization utilizing parameterization signatures according to various embodiments of the invention.

FIG. 7 illustrates a flowchart showing an example harness sub-assembly rationalization utilizing parameterization signatures according to various embodiments of the invention. Referring to FIG. 7, in a block 701, a computing system can generate a parameterized signature for a sub-assembly in a wire harness. For example, the computing system can modify a description of the sub-assembly in the wire harness to render a variable parameter in the description generic, and then generate the parameterized signature from the modified description of the sub-assembly in the wire harness. In some embodiments, the computing system can utilize a hash algorithm to compress the modified description, which can generate the parameterized signature for the sub-assembly.

In a block 702, the computing system can compare the parameterized signature against signatures of other sub-assemblies. In some embodiments, since entries in a library of sub-assemblies can be indexable by signatures or parameterized signatures of their associated sub-assemblies, the computing system can search the library of sub-assemblies to determine whether the parameterized signature matches one or more of the entries.

In an optional block 703, the computing system can identify a group of the other sub-assemblies with matching signatures based on the comparison. In some embodiments, the computing system can identify one or more of the sub-assemblies in the library have a same parameterized signature, which indicates that the group includes the identified sub-assemblies.

In a block 704, the computing system can identify a master sub-assembly of the group of the other sub-assemblies. In some embodiments, any entries in library of sub-assemblies that are indexable by a parameterized signature can correspond to master sub-assemblies for that parameterized signature. When there are multiple matches in block 702, the computing system can extract one or more tags or other portions of the corresponding library entries to determine whether the group of the other sub-assemblies includes at least one master sub-assembly.

In a block 705, the computing system can replace the sub-assembly with the master sub-assembly. For example, the computing system can assign a part number of the master sub-assembly to the structured bill of materials for the sub-assembly. When there are multiple masters for the parameterized signature, the computing system can analyze the extract tags or portions from the entries to determine which of the corresponding other sub-assemblies to replace the sub-assembly in the structured bill of materials.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
generating, by a computing system in response to execution of instructions, a structured bill of materials for a wire harness described in a harness design;
utilizing, by the computing system in response to execution of the instructions, a parameterized signature generated based, at least in part, on a variable parameter corresponding to a physical characteristic for a first sub-assembly in the structured bill of materials for the wire harness to identify a second sub-assembly stored in a library accessible by the computing system; and
substituting, by the computing system in response to execution of the instructions, the first sub-assembly in the structured bill of materials for the wire harness with the second sub-assembly.

2. The method of claim 1, wherein substituting the first sub-assembly in the structured bill of materials for the wire harness with the second sub-assembly further comprises replacing a part number of the first sub-assembly with a part number of the second sub-assembly in the structured bill of materials for the wire harness.

3. The method of claim 2, further comprising:
identifying, by the computing system, a group of one or more sub-assemblies having a same structure as the first sub-assembly except for the physical characteristic corresponding to the variable parameter; and
selecting, by the computing system, the second sub-assembly from the group of one or more sub-assemblies.

4. The method of claim 3, wherein identifying the group of one or more sub-assemblies having a same structure as the first sub-assembly except for the physical characteristic corresponding to the variable parameter further comprises:
generating the parameterized signature, which corresponds to the structure of the first sub-assembly except for the physical characteristic corresponding to the variable parameter; and comparing the parameterized signature against known parameterized signatures of sub-assemblies to identify the group of one or more sub-assemblies.

5. The method of claim 4, wherein the group of one or more sub-assemblies includes a master sub-assembly, and wherein the second sub-assembly is the master sub-assembly in the group of one or more sub-assemblies.

6. The method of claim 3, wherein the selection of the second sub-assembly from the group of one or more sub-assemblies is based on at least one of a cost of or a manufacturing availability of the first sub-assembly and each sub-assembly in the group of one or more sub-assemblies.

7. The method of claim 1, wherein the structured bill of materials is configured to hierarchically organize multiple sub-assemblies based on manufacturing operations to be utilized to build the wire harness.

8. A system comprising:
a memory system configured to store computer-executable instructions; and
a computing system, in response to execution of the computer-executable instructions, is configured to:
generate a structured bill of materials for a wire harness described in a harness design;
utilize a parameterized signature generated based, at least in part, on a variable parameter corresponding to a physical characteristic for a first sub-assembly in the structured bill of materials for the wire harness to identify a second sub-assembly stored in a library accessible by the computing system; and
substitute the first sub-assembly in the structured bill of materials for the wire harness with the second sub-assembly.

9. The system of claim 8, wherein the computing system, in response to execution of the computer-executable instructions, is further configured to replace a part number of the first sub-assembly with a part number of the second sub-assembly in the structured bill of materials for the wire harness.

10. The system of claim 9, wherein the computing system, in response to execution of the computer-executable instructions, is further configured to:
identify a group of one or more sub-assemblies having a same structure as the first sub-assembly except for the physical characteristic corresponding to the variable parameter; and
select the second sub-assembly from the group of one or more sub-assemblies.

11. The system of claim 10, wherein the computing system, in response to execution of the computer-executable instructions, is further configured to:
generate the parameterized signature, which corresponds to the structure of the first sub-assembly except for the physical characteristic corresponding to the variable parameter; and
compare the parameterized signature against known parameterized signatures of sub-assemblies to identify the group of one or more sub-assemblies.

12. The system of claim 11, wherein the group of one or more sub-assemblies includes a master sub-assembly, and wherein the second sub-assembly is the master sub-assembly in the group of one or more sub-assemblies.

13. The system of claim 10, wherein the selection of the second sub-assembly from the group of one or more sub-assemblies is based on at least one of a cost of or a manufacturing availability of the first sub-assembly and each sub-assembly in the group of one or more sub-assemblies.

14. An apparatus comprising at least one non-transitory computer-readable memory device storing instructions configured to cause one or more processing devices to perform operations comprising:
generating a structured bill of materials for a wire harness described in a harness design;
utilizing a parameterized signature generated based, at least in part, on a variable parameter corresponding to a physical characteristic for a first sub-assembly in the structured bill of materials for the wire harness to identify a second sub-assembly stored in a library accessible by the computing system; and
substituting the first sub-assembly in the structured bill of materials for the wire harness with the second sub-assembly.

15. The apparatus of claim 14, wherein substituting the first sub-assembly in the structured bill of materials for the wire harness with the second sub-assembly further comprises replacing a part number of the first sub-assembly with a part number of the second sub-assembly in the structured bill of materials for the wire harness.

16. The apparatus of claim 15, further comprising:
identifying, by the computing system, a group of one or more sub-assemblies having a same structure as the first sub-assembly except for the physical characteristic corresponding to the variable parameter; and
selecting, by the computing system, the second sub-assembly from the group of one or more sub-assemblies.

17. The apparatus of claim 16, wherein identifying the group of one or more sub-assemblies having a same structure as the first sub-assembly except for the physical characteristic corresponding to the variable parameter further comprises:
generating the parameterized signature, which corresponds to the structure of the first sub-assembly except for the physical characteristic corresponding to the variable parameter; and
comparing the parameterized signature against known parameterized signatures of sub-assemblies to identify the group of one or more sub-assemblies.

18. The apparatus of claim 17, wherein the group of one or more sub-assemblies includes a master sub-assembly, and wherein the second sub-assembly is the master sub-assembly in the group of one or more sub-assemblies.

19. The apparatus of claim 16, wherein the selection of the second sub-assembly from the group of one or more sub-assemblies is based on at least one of a cost of or a manufacturing availability of the first sub-assembly and each sub-assembly in the group of one or more sub-assemblies.

20. The apparatus of claim 14, wherein the structured bill of materials is configured to hierarchically organize multiple sub-assemblies based on manufacturing operations to be utilized to build the wire harness.

* * * * *